Aug. 30, 1966 R. A. BARKER 3,269,015
LAYOUT INSTRUMENT
Filed Feb. 3, 1964 2 Sheets-Sheet 1

INVENTOR
RONALD ANDREW BARKER
BY
*H. G. Hendry*
ATTORNEY

United States Patent Office 3,269,015
Patented August 30, 1966

3,269,015
LAYOUT INSTRUMENT
Ronald Andrew Barker, 474 Mayzel Road, Burlington,
Ontario, Canada
Filed Feb. 3, 1964, Ser. No. 342,116
7 Claims. (Cl. 33—27)

The present invention relates to a layout tool and it consists in the combinations, constructions and arrangements of parts hereinafter to be described and claimed.

Generally there is provided a layout tool consisting of a pair of arms having a common pivot member provided with a hollow central portion. The upper arm is of less length than the lower arm and both arms are provided with a longitudinally extending slot one side of each of which extends to a point adjacent the pivot member and which, if extended, would intersect the center of the hollow portion of such pivot member. The slots are open at the outer ends of each of the arms. A retractable rule is mounted on the outer portion of each of the arms and the device is so constructed that the retractable rule upon the upper arm (such arm being shorter than the lower arm) will, when the arms are positioned over one another in the same direction, not interfere with one another. The retractable rules are provided with indicia in inches or the like which begin after the length of the particular arm, as, for example, in an arm six inches long, the next inch indication on the retractable rule is "7." A protractor is integrally formed with the inner end portion of the lower arm and is provided with inwardly extending slots at 90° angles to one another and to the longitudinal slot contained in the lower arm. A block is affixed to the outer end of each of the retractable rules and each has an opening extending therethrough for the slidable reception of a scriber pin which may be locked in position with a set screw. A centering scriber pin having a handle at its upper end is slidably positioned within the hollow portion of the pivot member and a further scriber pin is provided for positioning in a plurality of holes formed in measured positions in the lower arm whereby arcs of less than the minimum dimensions provided for by the retractable rules may be inscribed by the device. The device is such that various angles may be scribed with the tool and, if the arms are placed at 90 degrees to each other squares or rectangles of any size may be accurately measured and laid out upon a flat surface. A novel locking means is provided for holding the arms in selected relative positions.

It is accordingly an object of the invention to provide a device of the character set forth which is simple in construction, inexpensive to manufacture and yet effective and efficient in use.

Another object of the invention is to provide, in a layout tool, novel retractable rules forming a part of the invention.

Another object of the invention is to provide, in a layout tool, a novel pivot member and novel locking means for a pair of arms interconnected by said member.

Still another object of the invention is to provide, in a layout tool, novel scriber pins forming parts of the invention.

Other and further objects of the invention will become apparent from a reading of the following specification taken in conjunction with the drawing, in which.

Figure 1:
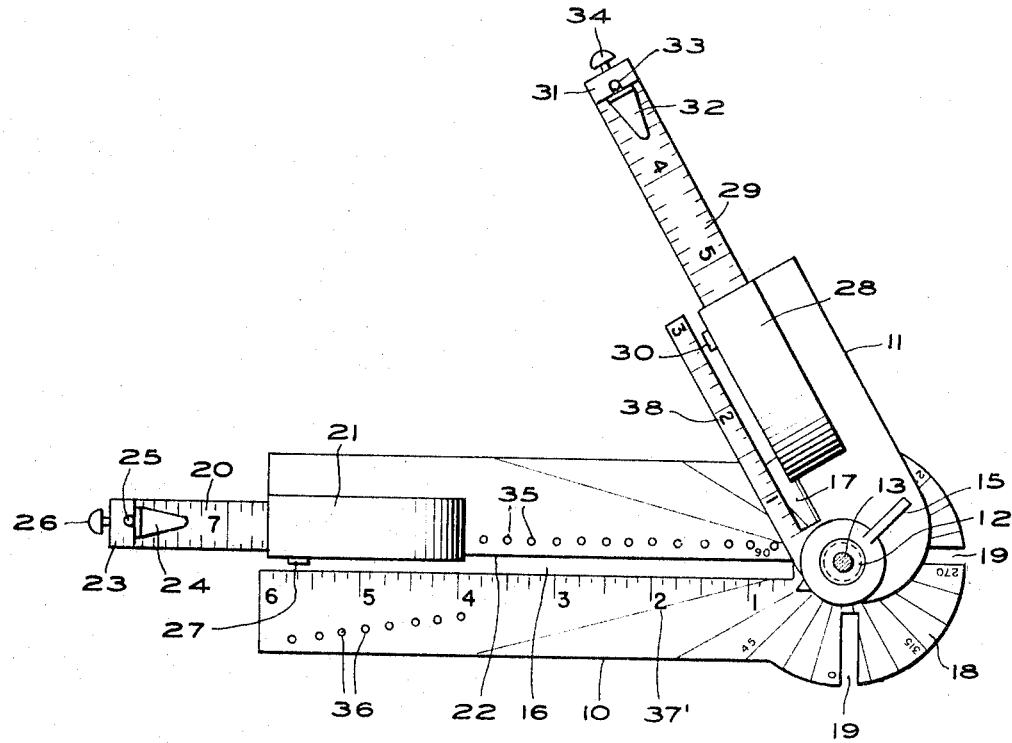
FIGURE 1 is a plan view of an embodiment of the invention.
Figure 2:
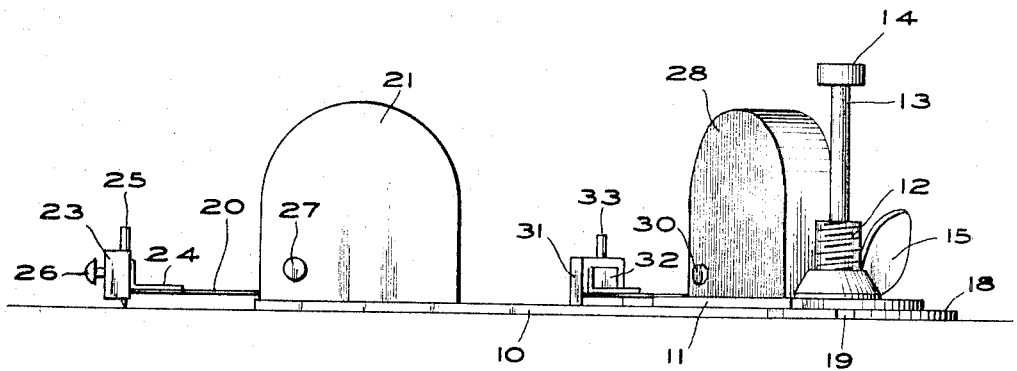
FIGURE 2 is a front elevational view of the device as illustrated in FIGURE 1.

Referring more particularly to the drawings, there is shown therein a layout tool having a lower arm 10 and an upper arm 11. An externally threaded pivot member 12 is centrally provided with a vertically extending circular opening in which is slidably mounted a centering pin 13 having a head 14 at its upper end. A wing nut 15 is threaded upon the centering member 12.

It will be noted that the arm 10 is of greater length than the arm 11 and, in the example illustrated, it will be seen that the arm 10 extends six inches from the center of the centering point 13 while the arm 11 extends but three inches from the center of the centering point 13. The arm 10 is provided with a longitudinally extending slot 16 which begins at a point approximately one-half inch from the center of the centering point 13 and extends throughout the length of the arm 10. Likewise the arm 11 is provided with a similar slot 17.

Integrally formed with the inner end portion of the arm 10 is a protractor 18 having radially inwardly directed slots 19 at right angles to one another and to the slot 16.

A retractable rule 20 is extensible from a casing 21 mounted on the arm 10 in such manner that the inner edge of the rule 20 forms an extension of the adjacent edge 22 of the slot 16. To the outer end of the rule 20 there is affixed a block 23 by means of a bracket 24 and a scriber pin 25 is vertically slidable in the block and may be locked in selected positions by a set screw 26. The rule 20 is provided with a lock pin 27 extending from one side of the casing 21.

Mounted adjacent the outer end portion of the arm 11 is a casing 28 from which extends a retractable rule 29 the inner edge of which is coextensive with the adjacent edge of the slot 17 and the rule 29 is likewise provided with a locking pin 30 extending from the housing 28 and, at its outer end, a block 31 is attached thereto by means of a bracket 32. A scriber pin 33 extends vertically and slidably through the block 31 and may be locked in selected positions therein by means of a set screw 34.

A plurality of equally spaced openings 35 is provided in the arm 10 adjacent one side of the slot 16 and a further series of openings 36 is provided in the arm 10 in angular relation to the slot 16 and on the other side thereof from the openings 35. A scriber pin 37 is selectively positionable in the openings 35 and 36. The arm 10 is provided with measuring indicia 37' which, in the example shown, measures inches from the center of the centering pin outwardly. Likewise the arm 11 is provided with similar indicia 38.

Figure 3:
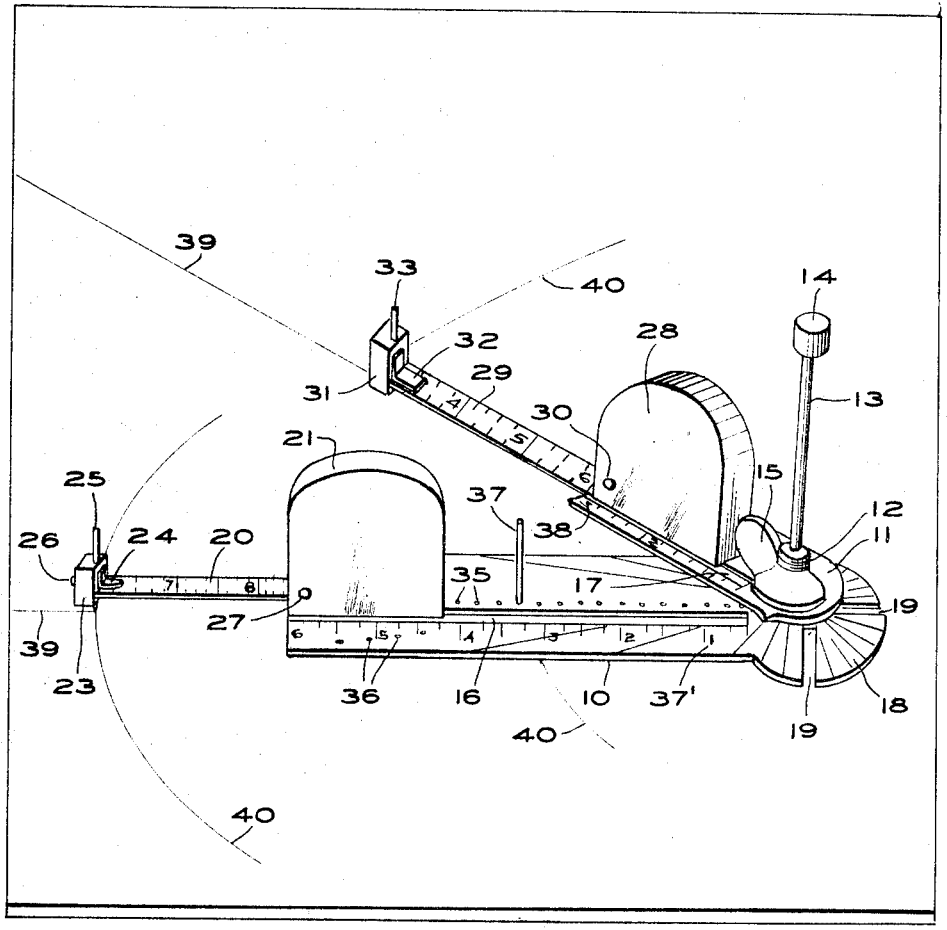
FIGURE 3 is a perspective view of the device in use.

In the operation of the device, it will be apparent that lines 39 (see FIGURE 3) may be formed at certain relative angular relation to each other while arcs 40 may be scribed by utilizing the centering pin 13 for the center point and any one of the scriber pins 25, 33 or 37 to inscribe the particular arc. It will also be apparent that the lock nut 15 may be utilized to lock the arms 10 and 11 in any given angular relation to each other and that, when the rules 20 and 29 are extended they effectively form extensions of one side of each of the slots 16 and 17, respectively. Thus extended lines 39 may be easily drawn and accurately measured with the rules 20 and 29 since the indicia contained on the rules 20 and 29 are effectively continuations of the indicia 37' and 38 on the arms 10 and 11, respectively.

While but one form of the invention has been shown and described herein, it will be readily apparent to those skilled in the art that many minor modifications may be made without departing from the spirit of the invention or the scope of the appended claims.

What is claimed is:

1. A layout tool comprising a relatively short arm, a relatively long arm, a pivot member interconnecting end portions of said arms, at intersecting axes thereof a retractable rule housing mounted on the free end portion of each of said arms, a rule blade extensible outwardly therefrom parallel to the said axis of its respective said arm and an edge on each said rule blade aligned and coincident with the said axis of its respective sand arm.

2. A layout tool as claimed in claim 1 incuding latching means associated with said pivot member for latching said arms in selected relative positions.

3. A layout tool as defined in claim 2 wherein said pivot member has a centrally disposed vertical opening therethrough, and including a centering pin is vertically slidable in said opening.

4. A layout tool as defined in claim 3 wherein each of said arms is provided with a longitudinal slot; one side edge of each said slot being aligned and coincident with the said axes of its respective said arm and with said edge of its associated rule blade.

5. A layout tool as defined in claim 4 wherein each of said rule blades has a block affixed to its outer end portion, said blocks each having a vertical opening therein, a scriber pin slidable in each of said vertical openings, and a set screw for said scriber pins in each of said blocks.

6. A layout tool as defined in claim 5 including linear measuring indicia marked on each said arm along an edge of its respective said longitudinal slot and wherein the longer of said arms is provided with a plurality of scriber pin-receiving openings.

7. A layout tool as claimed in claim 6 including registering slot means formed in one said arm along axes at right angles to the axis of its said longitudinal slot, and an edge on each of said registering slot means having an axis intersecting said pivot member.

References Cited by the Examiner

UNITED STATES PATENTS

| 738,130 | 9/1903 | Waymire | 33—115 X |
|---|---|---|---|
| 972,936 | 10/1910 | Smith | 33—75 X |
| 1,401,200 | 12/1921 | Smith | 33—1 |
| 1,638,914 | 8/1927 | Brush | 33—75 X |
| 2,581,858 | 1/1952 | Hilt et al. | 33—27 |
| 3,003,244 | 10/1961 | Fogliano | 33—88 |

FOREIGN PATENTS

| 35,152 | 11/1908 | Austria. |
|---|---|---|
| 195,050 | 2/1908 | Germany. |
| 22,315 | 1900 | Great Britain. |
| 470,745 | 4/1952 | Italy. |

LEONARD FORMAN, *Primary Examiner.*

ISAAC LISANN, *Examiner.*

HARRY N. HAROIAN, *Assistant Examiner.*